United States Patent Office 2,913,489
Patented Nov. 17, 1959

2,913,489

PREPARATION OF CARBOXYLIC ACIDS

Aldo De Benedictis, Berkeley, and Kenneth E. Furman, Richmond, Calif., assignors to Shell Development Company, New York, N.Y., a corporation of Delaware No Drawing. Application June 14, 1957
Serial No. 665,640

17 Claims. (Cl. 260—514)

This invention relates to the production of organic compounds and relates more particularly to the preparation of secondary and tertiary carboxylic acids from starting materials comprising carbon monoxide, alcohols and/or ethers.

It is known that reaction mixtures containing organic acids can be obtained by contacting an admixture of carbon monoxide, water and an organic component, such as an olefine, with a suitable catalyst under proper conditions. Many processes have been disclosed heretofore directed to the conversion of such admixtures to organic acid-containing mixtures. In all of them water in substantial amount is relied upon as an essential component of the initial charge. Because of inherent disadvantages, however, these processes have failed to provide a means for efficient large scale production of specific organic acids having at least four carbon atoms to the molecule. These disadvantages include, for example, a low yield of the desired organic acid; inability to produce a reaction product predominating in a single specifically desired acid; and the reliance upon the use of organic charge materials readily converted to unwanted by-products under the conditions employed. As a consequence of the complexity of the reaction mixtures often obtained in these processes and the relatively low content of the desired acid therein, the operation of recovering the desired compound in relatively pure state therefrom is often exceedingly difficult.

It is, therefore, an object of the present invention to provide an improved process for the production of organic acids from reactants comprising carbon monoxide and an organic component obviating the above difficulties. Another object of the invention is the provision of an improved process enabling the more efficient production of secondary and tertiary organic acids from carbon monoxide, alcohols and/or ethers. Still another object of the present invention is the provision of an improved process enabling the more efficient conversion of reactants consisting essentially of carbon monoxide, alcohols, and/or ethers to reaction products predominating in a single desired organic acid. Other objects and advantages of the present invention will become apparent from the following detailed description thereof.

It has now been found that secondary and tertiary organic acids are produced with substantially improved efficiency by reacting an alcohol and/or ether with carbon monoxide in the presence of concentrated sulfuric acid in the liquid phase, in the absence of any substantial amount of water, thereafter diluting the resulting reaction mixture with water in the absence of any substantial amount of free carbon monoxide, and separating organic acid from the resulting diluted reaction mixture.

The organic charge reacted with carbon monoxide in accordance with the invention comprises organic compounds containing one or more aliphatic carbinol or ether groupings as the sole reactive groups. Suitable organic compounds reacted with carbon monoxide in accordance with the invention comprise the alcohols and ethers represented by the empirical formula:

$$R^1\text{—O—}R^2 \qquad (I)$$

wherein $R^1$ represents a hydrocarbyl group containing at least three carbon atoms attached to the oxygen atom through an aliphatic carbon atom, and $R^2$ represents hydrogen or a hydrocarbyl group.

Thus $R^1$ and $R^2$ may each represent the same or a different member of the group consisting of aliphatic hydrocarbon radicals having at least three carbon atoms, preferably a saturated hydrocarbon radical, and aralkyl radicals. In addition $R^2$ may represent a member of the group consisting of aromatic hyrocarbon radicals and methyl and ethyl radicals. For example, $R^1$ and $R^2$ may, therefore, each represent the same or a different member of the group consisting of alkyl radicals, such as propyl, n-butyl, i-butyl, tert-butyl, amyl, hexyl, heptyl, octyl, nonyl, decyl; corresponding cycloalkyl and hydrocarbon-substituted cycloalkyl groups; aralkyl groups, such as benzyl, xylyl, tolyl, cumyl; homologues thereof; etc. In addition $R^2$ may represent methyl, ethyl and aryl and alkaryl groups, such as phenyl, and alkyl-substituted phenyl groups. Suitable organic charge to the process of the invention comprises the alcohols and ethers defined by the foregoing Formula I wherein one or more hydrogen atoms of the hydrocarbyl group are substituted by functional groups which are inert under the conditions of execution of the invention. Thus the hydrocarbyl group may have hydrogen therein substituted by a halogen, for example, chlorine, by $-NO_3$, $-CO$, etc. Comprised within the suitable charge materials to the process of the invention are alcohols and ethers containing more than one carbinol or ether grouping. Mixtures of two or more of the above-defined alcohols and/or ethers may be charged to the process of the invention.

Examples of alcohols and ethers of the above-defined class are: n-propanol, n-butanol, tert-butanol, isopropanol cyclohexanol, methylisobutyl carbinol, cyclopentyl carbinol, the normal secondary and tertiary hexanols, heptanols, octanols, nonanols, decanols, benzyl alcohol, triphenyl carbinol, trimethylene chlorohydrin, 4-methyl-4-pentene-2-ol, ricinoleic acid, di-isopropyl ether, methyl-tert-butyl ether, diphenyl ether; homologues and analogues thereof. A suitable charge material comprises the alcoholic products of the Oxo synthesis.

Alcohols having from three to twenty carbon atoms to the molecule and ethers having from four to twenty carbon atoms to the molecule constitute preferred charge materials to the process. Of the suitable alcohol and ether charge materials those wherein a hydroxyl group, or an ether oxygen atom, is directly attached to a secondary or tertiary carbon atom are particularly preferred.

The alcohol and/or ether charge to the process of the invention need not necessarily be pure. Impurities in the amounts generally encountered in these materials as obtained commercially have no adverse effect upon the efficiency of the process. Such impurities comprise, for example, residual hydrocarbon material from which the alcohols and ethers are derived.

The carbon monoxide reactant need not necessarily be pure. Suitable carbon monoxide charge materials comprise the commercially available carbon monoxide and carbon monoxide-containing gases. The presence therein of fixed gases and minor amounts of saturated hydrocarbons does not adversely affect the efficiency of the process.

Interaction of the alcohol and/or ether reactant with carbon monoxide in accordance with the invention is effected in the presence of concentrated sulfuric acid, Essential to the attainment of the objects of the invention is the use of sulfuric acid in concentrated form, that is, in a concentration above 90% and preferably above 95%. Dilute sulfuric acids generally lead to the obtaining of reaction mixtures containing relatively little if any of the desired carboxylic acids.

The reaction is executed in the presence of a molecular excess of concentrated sulfuric acid. Mole ratios of sulfuric acid to alcohol and/or ether charge in the range of from about 2:1 to about 10:1, have been found satisfactory. Greater or lesser amounts of sulfuric acid may, however, be employed within the scope of the invention. In a preferred method of executing the process of the invention the concentrated sulfuric acid is used in amounts exceeding about four moles of the acid per mole of alcohol and/or ether.

The reaction of the alcohol and/or ether reactant with carbon monoxide is carried out at relatively mild conditions. Temperatures of, for example, from about −10° to about 100° C., and preferably in the range of from about 20° to about 60° C. are employed. Pressures ranging from about atmospheric to about 1,500 p.s.i.g. and higher may be used. However, pressures higher than about 700 p.s.i.g. need generally not be used. Pressures in the range of, for example, from about 100 to about 650 p.s.i.g. are generally preferred. A particularly suitable pressure range is that from about 450 to about 550 p.s.i.g. Conditions are controlled so that at least the greater part of the alcohol and/or ether charge to the process is in the liquid phase throughout the course of the reaction.

Essential to the attainment of the objects of the invention is the avoidance of introduction of any substantial amount of water into the reaction zone from an outside source during the course of the reaction of the organic charge with the carbon monoxide.

Alcohol and/or ether, as well as the carbon monoxide charge to the process, may be subjected to suitable pretreatment to effect the removal of water and/or impurities therefrom. Such pretreatment may comprise one or more such steps as, for example, distillation, contact with suitable adsorbent material such as, for example, charcoal, adsorptive alumina, clays, etc.; the step chosen being governed by the material treated and the amount of impurity or water to be removed.

The reaction of the alcohol and/or ether with carbon monoxide in the presence of concentrated sulfuric acid may be executed in batch, continuous, or semi-continuous operations. In a suitable method of carrying out the process the concentrated sulfuric acid is first introduced into the reaction zone. The reaction zone is then brought up to the reaction pressure by the introduction of carbon monoxide. The alcohol and/or ether reactant is then introduced into the sulfuric acid, while under carbon monoxide pressure, in continuous or intermittent flow. The reaction zone is maintained at the desired reaction pressure by continuous pressuring with carbon monoxide. Contact between the alcohol, and/or ether and carbon monoxide in the absence of added water is continued for a sufficient length of time to obtain a desired degree of conversion. Means assuring efficient contact between reactants and acid, such as stirring or other agitating devices are provided. The contact time preferably employed will vary in accordance with operating conditions and nature of the specific organic charge to the process. A contact time in the time range of, for example, from about five minutes to three hours is generally satisfactory. Longer or shorter contact times may, however, be employed within the scope of the invention. Generally it is preferred to continue the reaction of carbon monoxide with the alcohol and/or ether charge in the absence of added water until the reaction has gone to substantial completion as evidenced by the cessation of carbon monoxide absorption. The reaction mixture is maintained at reaction temperature throughout the course of the reaction by suitable conventional means. Such suitable means may comprise, for example, means for adding heat to the reaction mixture, and/or for withdrawing heat therefrom.

Solvents which are liquid under the conditions of execution of the reaction may be used within the scope of the invention. Such solvent comprises, for example, normally liquid saturated hydrocarbons, such as heptanes, octanes; aliphatic ketones, such as dimethyl ketone; etc. The solvent employed may be added to the organic charge or introduced separately into the reaction zone. When the organic charge to the system is a high boiling or normally solid compound, it is at times advantageous to introduce it into the reaction zone as a solution in a suitable solvent.

It is preferred to maintain the reaction conditions of temperature and pressure, in the absence of added water, for a period of time beyond that at which substantial absorption of carbon monoxide by the liquid reaction mixture has stopped. Such "digestion period" of the reaction mixture may range, for example, from about five minutes to about three hours in excess of the reaction time employed. Shorter or longer digestion periods may be used within the scope of the invention. If desired, the digestion may be executed in a zone in communication with, but separate from, the zone in which initial absorption of carbon monoxide has taken place. The presence of an atmosphere of carbon monoxide, under the reaction pressure in the absence of added water is, however, maintained throughout the reaction and "digestion" periods.

Upon completion of the reaction of the carbon monoxide with the alcohol and/or ether, and after the digestion period if this is employed, flow of carbon monoxide to the reaction mixture is stopped, and if the mixture is at a temperature substantially above room temperature it is cooled to a temperature not substantially in excess of about 20° C. and brought to about atmospheric pressure.

The reaction mixture obtained by interaction of the carbon monoxide with the alcohol and/or ether in the presence of concentrated sulfuric acid and in the absence of water as defined above is thereupon diluted with water. The amount of water thus added to the reaction mixture may vary considerably within the scope of the invention. The water may be added to the reaction mixture in an amount ranging, for example, from as little as about 3% to as much as about 1,700% by volume of the acid originally charged is found satisfactory. Greater or lesser amounts of water may, however, be employed within the scope of the invention. In a preferred method of carrying out the invention the water is added to the reaction mixture in an amount equal to from about 75% to about 500% by volume of the acid originally charged. Dilution of the reaction mixture is preferably carried out without substantial increase in temperature. It will be noted that the addition of water to the reaction mixture is effected only after completion of the reaction of carbon monoxide with alcohol and/or ether. The water addition is effected in the absence of carbon monoxide addition and preferably in the absence of a free carbon monoxide atmosphere. The addition of the water is preferably effected at temperatures and pressures which do not substantially exceed, and which may be less than, atmospheric.

Under the above-defined conditions the reactants comprising carbon monoxide and alcohol and/or ether are converted to reaction products comprising secondary and tertiary organic acids. When the organic charge to the process consists of a secondary or tertiary alcohol, the organic acid product in the diluted reaction mixture will generally consist of the acid obtained by the substitution of a carboxylic acid group (—COOH) for the OH group attached to the carbinol carbon atom of the alcohol charge. Thus an alcohol charge of the formula $R^1OH$ will result in an organic acid of the formula R¹COOH wherein R¹ has the same meaning as in the foregoing Formula I. Under the prescribed conditions the use of tert-butyl alcohol as the alcohol charge to the process of the invention results in a reaction mixture containing trimethyl acetic acid (pivalic acid) as the predominant organic acid product. Similarly the use of methylisobutyl carbinol results in a product comprising 2,4-dimethylvaleric acid; cyclohexanol results in cyclohexane carboxylic acid; isopropyl alcohol in isobutyric acid, etc. The use of a primary alcohol as charge will generally result in a secondary acid corresponding to the compound obtained by replacing the —OH group with hydrogen and substituting a carboxylic acid group for a hydrogen attached to the carbon adjacent to the carbinol group of the charge. Thus, n-butyl alcohol reacts with carbon monoxide to form 2-methylbutanoic acid.

When the organic component of the charge to the process consists of an ether of the class defined above the reaction products obtained will comprise the acids corresponding to the compounds obtained by substituting a carboxylic acid group (—COOH) for the ether linkage in each of the hydrocarbyl radicals linked to the ether oxygen atom having more than three carbon atoms to the molecule. Thus ethers having the composition of the above-defined Formula I will result in reaction products comprising the organic acids R¹COOH and R²COOH wherein R¹ and R² have the meaning defined above and each has at least three carbon atoms. When the hydrocarbyl radical R² in the foregoing Formula I has less than three carbons it does not readily form a corresponding acid but will often be converted to a corresponding carbinol or form an ester of the acid product. Thus under the conditions defined herein the use of diisopropyl ether as the organic charge to the process results in a reaction product comprising isobutyric acid. The use of methyl tert-butyl ether as organic charge results in the obtaining of a reaction product comprising pivalic acid, methanol, and generally some methyl pivalate.

The process of the invention enables the production of highly valuable organic acids from carbon monoxide and alcohols and/or ethers to proceed efficiently with relatively high yields and a minimum of operative steps. The reaction mechanism involved is not straight forward and does not lend itself readily to definition. Formation of intermediate compounds generally takes place. These will vary in composition with the nature of the specific organic charge used and the operating conditions maintained. When using as an organic component of the charge an alcohol containing two aliphatic carbinol groups separated by no more than three carbon atoms in a common chain, the intermediate compound formed will often consist of a lactone. The lactone intermediate is, however, converted by hydrolysis to hydroxycarboxylic acid corresponding to the compound obtained by replacing a hydroxyl group of the charge with a carboxylic acid group. If desired, all or a part of the lactone initially formed may be separated as a final product by terminating the reaction before hydrolysis of the lactone has taken place.

The desired organic acid product is separated from the diluted reaction mixture by conventional means comprising one or more such steps as, for example, stratification, decantation, crystallization, filtering, distillation, extractive distillation, solvent extraction, and the like. Dilution of the reaction mixture with water as defined above may result in a diluted reaction mixture separating readily into an aqueous phase and an organic phase. If organic solvent is employed in the process this will generally be found in the organic phase. Recovery of the organic acid from the separated phases may be carried out by conventional means.

The following examples are illustrative, but not limiting, of the claimed invention:

*Example I*

500 cc. of concentrated sulfuric acid (96%) were charged to a stainless steel turbomixer. The reactor was brought to a pressure of 500 p.s.i.g. by forcing in carbon monoxide. A solution of tert-butyl alcohol in n-heptane containing 60% by volume of tert-butyl alcohol was fed into the reactor. The reactor was maintained at a temperature of 20° C. and a pressure of 500 p.s.i.g. The 500 p.s.i.g pressure was maintained by forcing in carbon monoxide to replace that consumed. A total of 1.80 moles of tert-butyl alcohol were charged in a three hour period. The reaction conditions of 20° C. and 500 p.s.i.g. were maintained for another 2.5 hours. At the end of this period the pressure was reduced to atmospheric by cutting off the source of carbon monoxide and venting. The reaction mixture was then diluted with water; care being taken to maintain the temperature below about 20° C. throughout the dilution. Dilution of the reaction mixture resulted in the formation of a supernatant organic phase and a lower aqueous phase. The organic phase was washed with water. Distillation of the two phases resulted in obtaining organic acid found to be trimethylacetic acid (pivalic acid). The trimethylacetic acid was obtained in a yield of 85% and had the following properties: boiling temperature of 89° C. at 38 mm., melting point of 33.1° C., molecular weight of 102.

When the operation was repeated under substantially identical conditions but with the exception that 65% sulfuric acid was used instead of concentrated acid no reaction with carbon monoxide was evident and no detectable amount of organic acid was found in the resulting mixture.

*Example II*

500 cc. of concentrated sulfuric acid (96%) were charged to a stainless steel reactor provided with a stirrer. The reactor was pressured to 500 p.s.i.g. by connection to a high pressure source of carbon monoxide. A total of 2.16 moles of methylisobutyl carbinol was slowly introduced into the reactor over a period of 155 minutes. The mixture was then maintained under these reaction conditions for another 90 minutes. Throughout this time the reactor was maintained at a temperature of 20° C. The pressure was maintained at 500 p.s.i.g. by continuously forcing in carbon monoxide to replace that consumed in the operation. At the end of the operation the reactor contents were brought to atmospheric pressure by cutting the source of carbon monoxide to the reactor and venting. The resulting mixture was then diluted with water at room temperature. An upper organic phase separated from an aqueous phase. By distillation of the resulting upper phase there was recovered an organic acid boiling at 108° C. at 20 mm. The acid had a specific gravity of 0.9178 at 20° C. and a refractive index $$\left(n\frac{20}{D}\right) \text{ of } 1.42098$$

2.2 moles of organic acid found to be 2,4-dimethylvaleric acid was thus obtained. This is equivalent of to 94.5% of theory. Fractionation of the reaction mixture indicated the additional presence of only unreacted methylisobutyl carbinol and a trace of polymer.

A repetition of the operation at a pressure of 100 p.s.i.g. resulted in a yield of 2.03 moles of crude 2,4-dimethylvaleric acid from 2.20 moles of methylisobutyl carbinol charge. This represents 92% of theory.

*Example III*

1.57 moles of cyclohexanol containing 25% by volume of added n-heptane were added to 500 cc. of concentrated sulfuric acid under a carbon monoxide pressure of 500 p.s.i.g. Addition of the cyclohexanol was effected over a period of 103 minutes with stirring. Reaction conditions and stirring were maintained for another 30 minutes. The reactor was maintained at the 500 p.s.i.g. carbon monoxide pressure and at a temperature of 18° C. throughout the procedure. At the end of this period the reactor was vented to atmospheric pressure and addition of carbon monoxide terminated. The mixture was then diluted with water and the resulting diluted mixture subjected to distillation. The reaction product was found to contain 1.18 moles (75% of theory) of organic acid and 0.02 mole of ester. The organic acid was found to consist of 50% cyclohexane carboxylic acid and 50% methylcyclopentane carboxylic acid.

*Example IV*

1.61 moles of hexylene glycol, as a 70% solution in n-heptane, was added to 500 cc. of concentrated sulfuric acid, maintained under a carbon monoxide pressure of 500 p.s.i.g., over a period of three hours. The reactor was maintained at a temperature of 20° C. The temperature and pressure conditions were maintained over an additional 2.5 hours. At the end of this time connection of the reactor to the high pressure carbon monoxide source was broken and the reactor was vented to atmospheric pressure. The resulting mixture was diluted with water, the temperature during dilution being maintained below 20° C. Distillation of the resulting diluted mixture and examination of the products indicated the presence of 0.21 mole of organic acid presumed to be a $C_8$ dicarboxylic acid. 0.53 mole $C_7$ lactone indicated to be 2,4,4-trimethylbutyro lactone.

*Example V*

0.34 mole of 2,5-dimethylhexane-2,5 diol was dissolved in 500 cc. of concentrated sulfuric acid (96%) and maintained under a carbon monoxide pressure of 500 p.s.i.g. at 20° C. for 78 minutes. Thereafter the reactor pressure was reduced to atmospheric by breaking the high pressure carbon monoxide flow and venting. The reaction mixture was then diluted with 2,000 cc. of water. There was obtained 0.15 mole of organic acid presumed to be a $C_{10}$ dicarboxylic acid and 0.08 mole of a $C_9$ lactone.

*Example VI*

Reaction of ricinoleic acid with carbon monoxide at 20° C. and a carbon monoxide pressure of 500 p.s.i.g. in the manner described in the foregoing examples, followed by dilution of the reaction mixture with water at atmospheric pressure in the substantial absence of an atmosphere of free carbon monoxide resulted in a reaction product containing $C_{20}$ tribasic organic acid.

*Example VII*

69 cc. of diisopropyl ether was added to 500 cc. of concentrated sulfuric acid (96%) in a reactor maintained at a temperature of 42° C. and a constant carbon monoxide pressure of 500 p.s.i.g. Addition of the ether was accomplished over a period of 90 minutes. Reaction conditions were maintained for another 35 minutes. Thereupon the reactor was brought to atmospheric pressure by shutting off the source of high pressure carbon monoxide and venting. The resulting reaction mixture was then dumped into ice water. Distillation of the resulting diluted reaction mixture and analysis of the products showed a yield of 70% of isobutyric acid.

*Example VIII*

74 cc. of methyl tert-butyl ether was added to 500 cc. of concentrated sulfuric acid (96%) in a reactor maintained at a temperature of 42° C. and a constant carbon monoxide pressure of 500 p.s.i.g. Addition of the ether to the reactor was effected over a period of 99 minutes. Thereafter the pressure in the reactor was reduced to atmospheric by breaking the flow of high pressure carbon monoxide thereto and by venting. The resulting reaction mixture was diluted with water at atmospheric pressure and at a temperature below 20° C. in the substantial absence of free carbon monoxide. Distillation of the resulting diluted reaction mixture and examination of the products obtained indicated a yield of pivalic acid of 65%. Methanol and methylpivalate were additionally found present in the reaction mixture.

*Example IX*

0.47 mole of n-propyl alcohol was reacted with carbon monoxide in the presence of concentrated sulfuric acid (96%) at a temperature of 48° C. under a carbon monoxide pressure of 500 p.s.i.g. The alcohol was dissolved in sulfuric acid then pressured with carbon monoxide and reacted for 8.5 hours at 48° C. Thereafter the reactor was brought to atmospheric pressure and the resulting reaction mixture was diluted with water in the absence of a free carbon monoxide atmosphere. Distillation of the resulting diluted reaction mixture and examination of the products obtained indicated a 62% yield of isobutyric acid and 13% of isopropyl alcohol.

We claim as our invention:

1. The process for the synthesis of carboxylic acids which comprises reacting a compound selected from the group consisting of aliphatic and alicyclic alcohols having from three to twenty carbon atoms and their ethers, in the liquid phase, with carbon monoxide in the presence of concentrated sulfuric acid having an acid strength of at least 90%, in the absence of added water, at a temperature of from about −10° to about 100° C. at a pressure of from about atmospheric to about 1,500 p.s.i.g., thereafter diluting the resulting reaction mixture with water in the absence of any substantial amount of free carbon monoxide, and separating a carboxylic acid from the resulting diluted reaction mixture.

2. The process in accordance with claim 1 wherein said concentrated sulfuric acid has a strength of at least 95%.

3. The process in accordance with claim 1 wherein said reaction is executed at a temperature of from about 20° to about 60° C.

4. The process in accordance with claim 3 wherein said reaction is executed at a pressure of from about 100 to about 650 p.s.i.g. and said dilution is effected at substantially atmospheric pressure.

5. The process for the production of a carboxylic acid which comprises reacting an aliphatic alcohol having from three to twenty carbon atoms with carbon monoxide in the liquid phase, in the presence of concentrated sulfuric acid having an acid strength of at least 90%, in the absence of added water, at a temperature of from about −10° to about 100° C., at a pressure of from about atmospheric to about 700 p.s.i.g., thereafter diluting the resulting reaction mixture with water in the absence of any substantial amount of free carbon monoxide, and separating a carboxylic acid from the resulting diluted reaction mixture.

6. The process in accordance with claim 5 wherein said reaction is executed at a temperature of from about 20° to about 60° C.

7. The process in accordance with claim 6 wherein said reaction is executed at a pressure of from about 100 to about 700 p.s.i.g., and said dilution is effected at substantially atmospheric pressure.

8. The process for the production of trimethylacetic acid which comprises reacting tert-butyl alcohol with carbon monoxide in the liquid phase, in the presence of concentrated sulfuric acid having an acid strength of at least 90%, in the absence of added water, at a temperature of from about 20° to about 60° C., at a pressure of from about 100 to about 700 p.s.i.g., thereafter diluting the resulting reaction mixture with water at substantially atmospheric pressure in the absence of any substantial amount of free carbon monoxide, and separating trimethylacetic acid from the diluted reaction mixture.

9. The process for the production of cyclohexane carboxylic acid which comprises reacting cyclohexanol with carbon monoxide in the liquid phase, in the presence of concentrated sulfuric acid having an acid strength of at least 90%, in the absence of added water, at a temperature of from about 20° to about 60° C., at a pressure of from about 100 to about 700 p.s.i.g., thereafter diluting the resulting reaction mixture with water at substantially atmospheric pressure in the absence of any substantial amount of free carbon monoxide, and separating cyclohexane carboxylic acid from the resulting reaction mixture.

10. The process for the production of 2,4-dimethylvaleric acid which comprises reacting methylisobutylcarbinol with carbon monoxide in the liquid phase, in the presence of concentrated sulfuric acid having an acid strength of at least 90%, in the absence of added water, at a temperature of from about 20° to about 60° C., at a pressure of from about 100 to about 700 p.s.i.g., thereafter diluting the resulting reaction mixture with water at substantially atmospheric pressure in the absence of any substantial amount of free carbon monoxide and separating 2,4-dimethylvaleric acid from the resulting reaction mixture.

11. The process for the production of a carboxylic acid which comprises reacting an aliphatic ether having up to twenty carbon atoms and containing an alkyl group of at least three carbon atoms with carbon monoxide in the liquid phase, in the presence of concentrated sulfuric acid having an acid strength of at least 90%, in the absence of added water, at a temperature of from about −10° to about 100° C., at a pressure of from about atmospheric to about 700 p.s.i.g., thereafter diluting the resulting reaction mixture with water in the absence of any substantial amount of free carbon monoxide, and separating a carboxylic acid from the resulting diluted reaction mixture.

12. The process in accordance with claim 11 wherein said reaction is executed at a temperature of from about 20° to about 60° C.

13. The process in accordance with claim 12 wherein said reaction is executed at a pressure of from about 100 to about 700 p.s.i.g., and said dilution is effected at substantially atmospheric pressure.

14. The process for the production of isobutyric acid which comprises reacting diisopropyl ether with carbon monoxide in the liquid phase, in the presence of concentrated sulfuric acid having an acid strength of at least 90%, in the absence of added water, at a temperature of from about 20° to about 60° C., at a pressure of from about 100 to about 700 p.s.i.g., thereafter diluting the resulting reaction mixture with water at substantially atmospheric pressure in the absence of any substantial amount of free carbon monoxide, and separating isobutyric acid from the diluted reaction mixture.

15. The process for the production of pivalic acid which comprises reacting methyl tert-butyl ether with carbon monoxide, in the liquid phase, in the presence of concentrated sulfuric acid having an acid strength of at least 90%, in the absence of added water, at a temperature of from about 20° to about 60° C. at a pressure of from about 100 to about 700 p.s.i.g., thereafter diluting the resulting reaction mixture with water at substantially atmospheric pressure in the absence of any substantial amount of free carbon monoxide, and separating pivalic acid from the diluted reaction mixture.

16. The process for the production of carboxylic acids which comprises absorbing carbon monoxide in concentrated sulfuric acid having an acid strength of at least 90% at a temperature of from about −10° to about 100° C. under an elevated carbon monoxide pressure, introducing into said carbon monoxide-containing concentrated sulfuric acid in the absence of added water while maintaining said temperature and said elevated carbon monoxide pressure a compound selected from the group consisting of aliphatic and alicyclic alcohols having from three to twenty carbon atoms and their ethers, thereafter reducing the pressure on the resulting reaction mixture to substantially atmospheric pressure, diluting said resulting reaction mixture with water while at substantially atmospheric pressure in the absence of any substantial amount of free carbon monoxide, and separating a carboxylic acid from the diluted reaction mixture.

17. The process in accordance with claim 16 wherein said compound introduced into said carbon monoxide-containing concentrated sulfuric acid is tert-butyl alcohol.

References Cited in the file of this patent

UNITED STATES PATENTS

| 1,864,643 | Dreyfus et al. | June 28, 1932 |
| 2,419,131 | Ford | Apr. 15, 1947 |
| 2,831,877 | Koch | Apr. 22, 1958 |

FOREIGN PATENTS

| 319,030 | Great Britain | Sept. 16, 1929 |

OTHER REFERENCES

Wagner et al.: Synthetic Organic Chemistry, pages 32, 35, 40, 41 and 437 (1953).